(12) United States Patent  
Faust et al.

(10) Patent No.: US 11,445,730 B2  
(45) Date of Patent: Sep. 20, 2022

(54) PRODUCT ROLLING ARRANGEMENT

(71) Applicant: Packaging Progressions, Inc., Souderton, PA (US)

(72) Inventors: Charles D. Faust, Bensalem, PA (US); Iordan Djambov, Jamison, PA (US)

(73) Assignee: PACPROINC, LLC, Souderton, PA (US)

( * ) Notice: Subject to any disclaimer, the term of this patent is extended or adjusted under 35 U.S.C. 154(b) by 308 days.

(21) Appl. No.: 16/589,786

(22) Filed: Oct. 1, 2019

(65) Prior Publication Data

US 2020/0138044 A1    May 7, 2020

Related U.S. Application Data

(60) Provisional application No. 62/756,872, filed on Nov. 7, 2018.

(51) Int. Cl.  
*A21C 3/06* (2006.01)

(52) U.S. Cl.  
CPC ..................... *A21C 3/06* (2013.01)

(58) Field of Classification Search  
CPC ........... A21C 3/06; A21C 3/065; A21C 9/063; A21C 3/024–028  
See application file for complete search history.

(56) References Cited

U.S. PATENT DOCUMENTS

| | | |
|---|---|---|
| 2,521,577 A | 9/1950 | Gannon |
| 3,846,957 A | 11/1974 | Divan |
| 3,861,291 A | 1/1975 | Guzaski |
| 4,003,184 A | 1/1977 | Shiu |
| 4,065,911 A | 1/1978 | Fagan |
| 4,342,182 A | 8/1982 | Dennis et al. |
| 4,608,919 A | 9/1986 | Prows et al. |
| 5,281,120 A | 1/1994 | Morikawa et al. |
| 5,893,321 A | 4/1999 | Capetta et al. |
| 6,349,635 B2 | 2/2002 | Taguchi |
| 10,011,444 B2 | 7/2018 | Corallo et al. |
| 2015/0369649 A1 | 12/2015 | McLaughlin et al. |

(Continued)

FOREIGN PATENT DOCUMENTS

| | | | |
|---|---|---|---|
| CA | 1 325 137 C | 12/1993 | |
| DE | 591 450 C | 1/1934 | |
| DE | 4402346 A1 * | 8/1995 | ............... A21C 3/06 |

(Continued)

OTHER PUBLICATIONS

CashinEDGE® HS Retail Bacon, Jul. 16, 2013, Provisur Technologies (see website https://www.provisur.com/en/equipment-details/slicing/cashinedge-hs-retail-bacon).

(Continued)

*Primary Examiner* — Niki Bakhtiari  
*Assistant Examiner* — John J DeRusso  
(74) *Attorney, Agent, or Firm* — Crowell & Moring LLP

(57) ABSTRACT

An arrangement for rolling a product is disclosed. The arrangement includes a drive conveyor, and a rolling assembly positioned above the drive conveyor. The rolling assembly includes: an arm adapted to be driven between (i) a rolling position and (ii) a release position. A product turner is attached to the arm, such that in the rolling position, an end of the product turner extends into a conveying path of the drive conveyor.

8 Claims, 20 Drawing Sheets

(56) References Cited

U.S. PATENT DOCUMENTS

2019/0364910 A1* 12/2019 Bernhardt ................ A21C 3/06
2021/0045391 A1*  2/2021 Harada .................... A21C 3/06

FOREIGN PATENT DOCUMENTS

| EP | 3085235 B1 * | 5/2019 | ............... A21C 3/06 |
| ES | 2256373 T3 | 7/2006 | |
| GB | 509 127 A | 7/1939 | |
| WO | WO 89/10697 A1 | 11/1989 | |
| WO | WO 95/20322 A1 | 8/1995 | |

OTHER PUBLICATIONS

Bacon Card Dispenser, Nov. 1, 2013, Packaging Progressions Inc. (see https://www.pacproinc.com/video/bacon/).
International Search Report and Written Opinion from corresponding International Application No. PCT/US19/54043, 14pgs., Dec. 30, 2019.
Extended European Search Report regarding EP19 88 2979 dated Jun. 29, 2022, 8 pages.

* cited by examiner

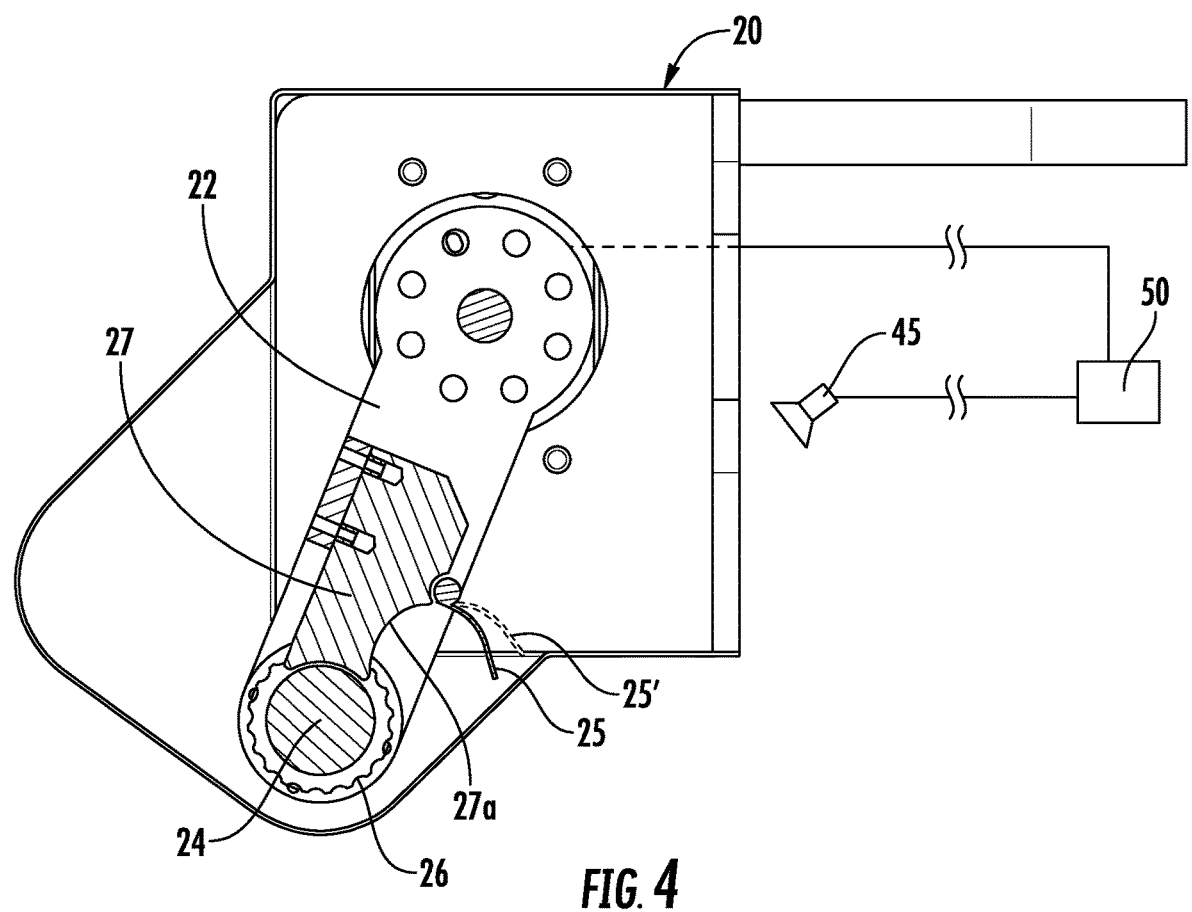

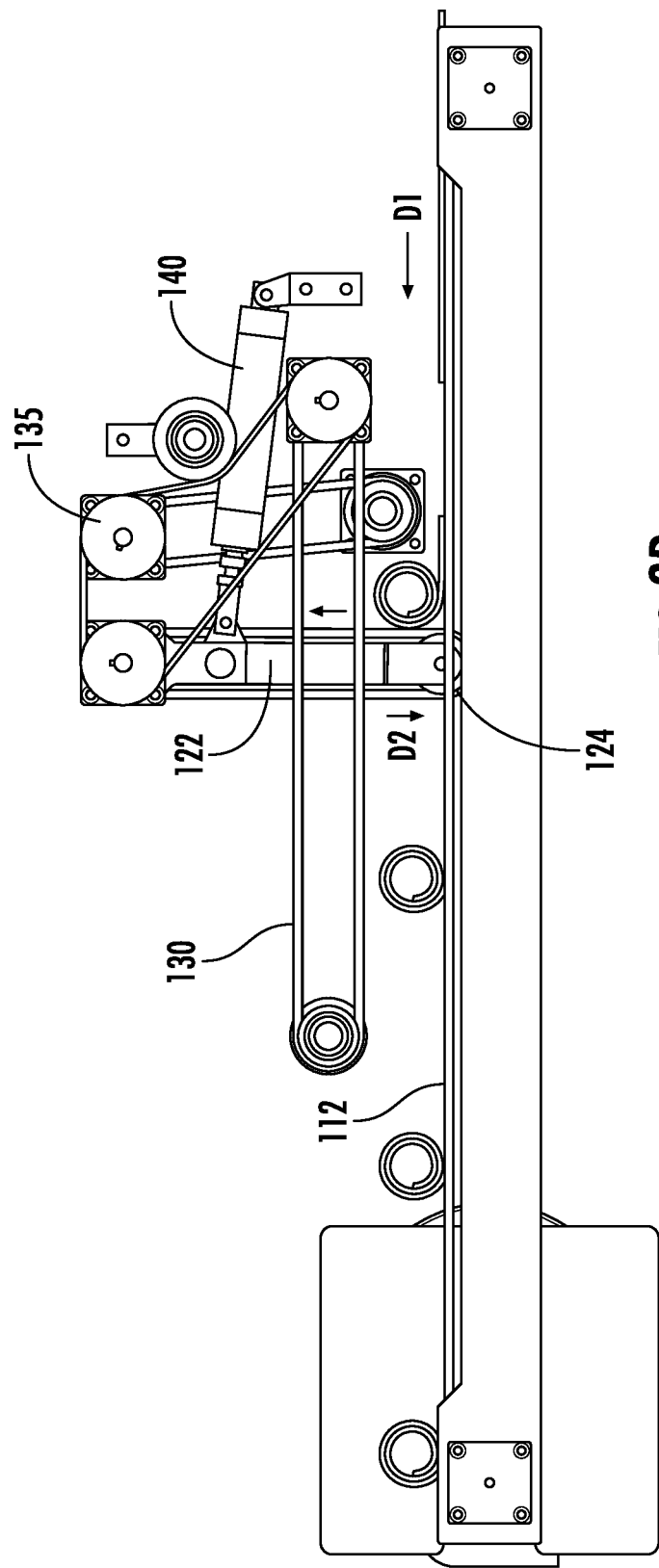

PRODUCT ROLLING ARRANGEMENT

CROSS REFERENCE TO RELATED APPLICATION

This application claims the benefit of U.S. Provisional Application No. 62/756,872 filed Nov. 7, 2018, which is incorporated by reference as if fully set forth.

FIELD OF INVENTION

The present invention relates to a conveyor arrangement, and more particularly relates to a rolling assembly for a conveyor arrangement.

BACKGROUND

Conveyor arrangements for food products are well known. One type of food product includes sheets of food, such as sheets of dough or meat. To further process these types of food products, the sheets must be rolled, which is typically manually performed by assembly personnel. Manually rolling food product is time consuming and often results in inconsistencies.

It would be desirable to provide a more reliable and less time consuming arrangement to process sheets of food products.

SUMMARY

An improved arrangement for rolling a product is provided.

In one embodiment, the arrangement includes a drive conveyor, and a rolling assembly positioned above the drive conveyor. The rolling assembly includes an arm adapted to be driven between (i) a rolling position and (ii) a release position. A product turner is attached to the arm, such that in the rolling position, an end of the product turner extends into a conveying path of the drive conveyor.

In one embodiment, the product turner is a rolling conveyor. A belt drive system includes a plurality of belts and rollers and an actuator. The actuator is configured to drive the rolling conveyor between the rolling position and the release position, and the belt drive system is configured to drive the rolling conveyor.

In one embodiment, the product turner includes a roller attached to a terminal end of the arm and defines a radially outer engagement surface. The roller is adapted to rotate. A guide flap is mounted on the arm and hangs from the arm. The guide flap is adapted to articulate from a first position prior to contact with a product to a second position upon contact with a product. At least one roll guide is mounted on the arm and is positioned adjacent to the roller. The roll guide defines a curved guide surface adapted to engage the product.

In one embodiment, at least one actuator is configured to drive the arm between the rolling position and the release position, and is configured to rotate the roller.

In one embodiment, a central processing unit (CPU) is provided that includes a timer. The CPU is configured to receive a signal from the sensor and initiate a countdown operation after which the CPU provides a signal to the at least one actuator to drive the arm from the rolling position to the release position.

In another embodiment, an arrangement for rolling a product is disclosed. The arrangement includes a drive conveyor adapted to drive a product in a driving direction, and a rolling assembly positioned above the drive conveyor. The rolling assembly includes an arm adapted to be driven between a rolling position and a release position. A roller is attached to a terminal end of the arm and defines a radially outer engagement surface including a plurality of grooves. The roller is adapted to rotate. The roller is positioned in a conveying path of the drive conveyor when the arm is in the rolling position and the roller is positioned away from the conveying path of the drive conveyor when the arm is in the release position. At least one actuator is configured to drive the arm between the rolling position and the release position, and is configured to rotate the roller. A guide flap is mounted on the arm and hangs from the arm. The guide flap has a curved profile and is adapted to articulate upon contact with the product. At least one roll guide is mounted on the arm and is positioned adjacent to the roller. The at least one roll guide defines a curved guide surface adapted to engage the product.

A method of rolling a product is also disclosed that includes providing at least one of the arrangements disclosed herein.

Other embodiments are disclosed herein.

BRIEF DESCRIPTION OF THE DRAWINGS

The foregoing Summary and the following detailed description will be better understood when read in conjunction with the appended drawings, which illustrate a preferred embodiment of the invention. In the drawings:

FIG. 4 is an alternative side view of the rolling assembly.

FIG. 8D illustrates a side view of the rolling arrangement of FIGS. 8A-8C.

DETAILED DESCRIPTION OF THE PREFERRED EMBODIMENTS

Figure 1A:
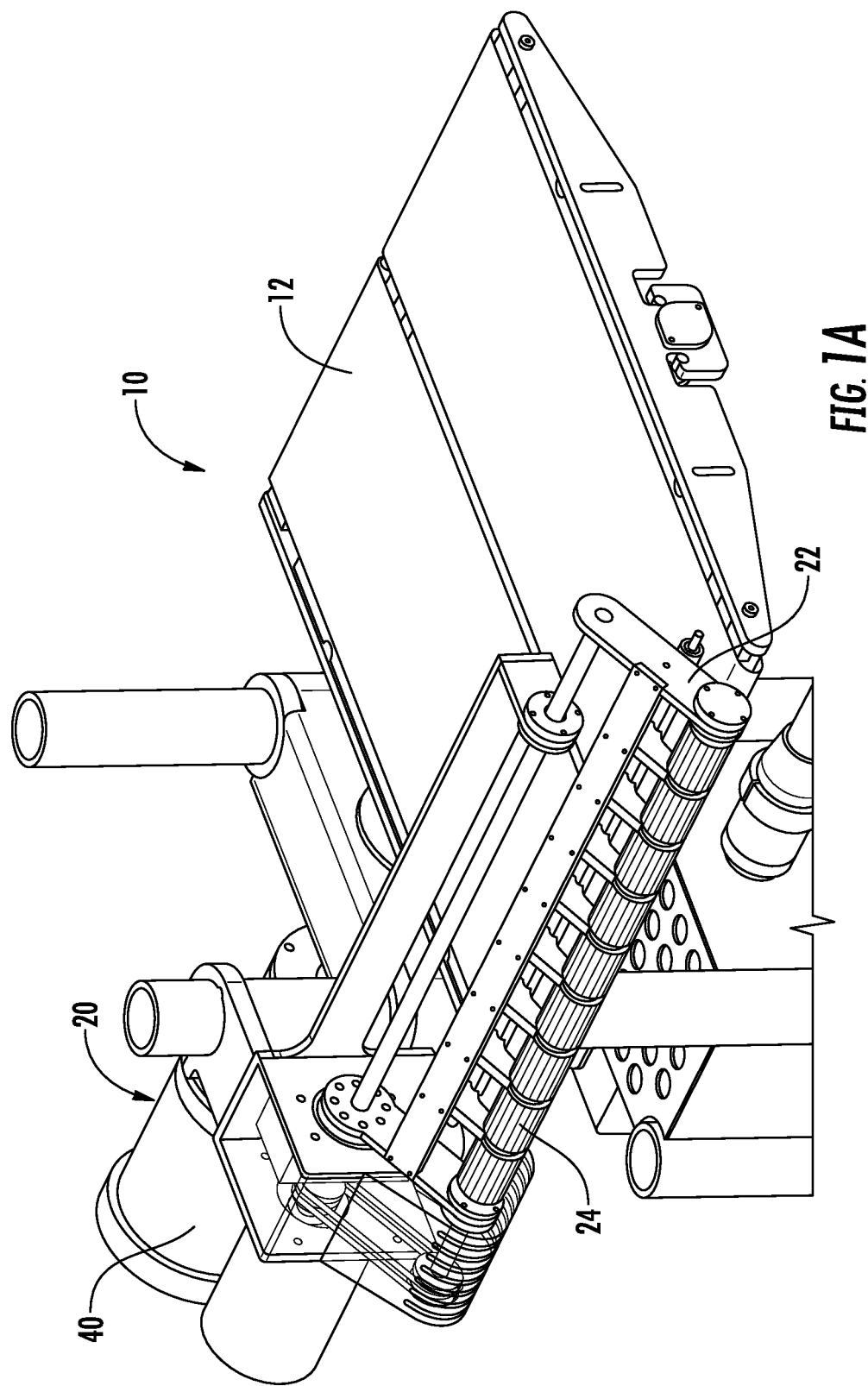
FIG. 1A is a perspective view of a rolling arrangement according to an embodiment.
Figure 1B:
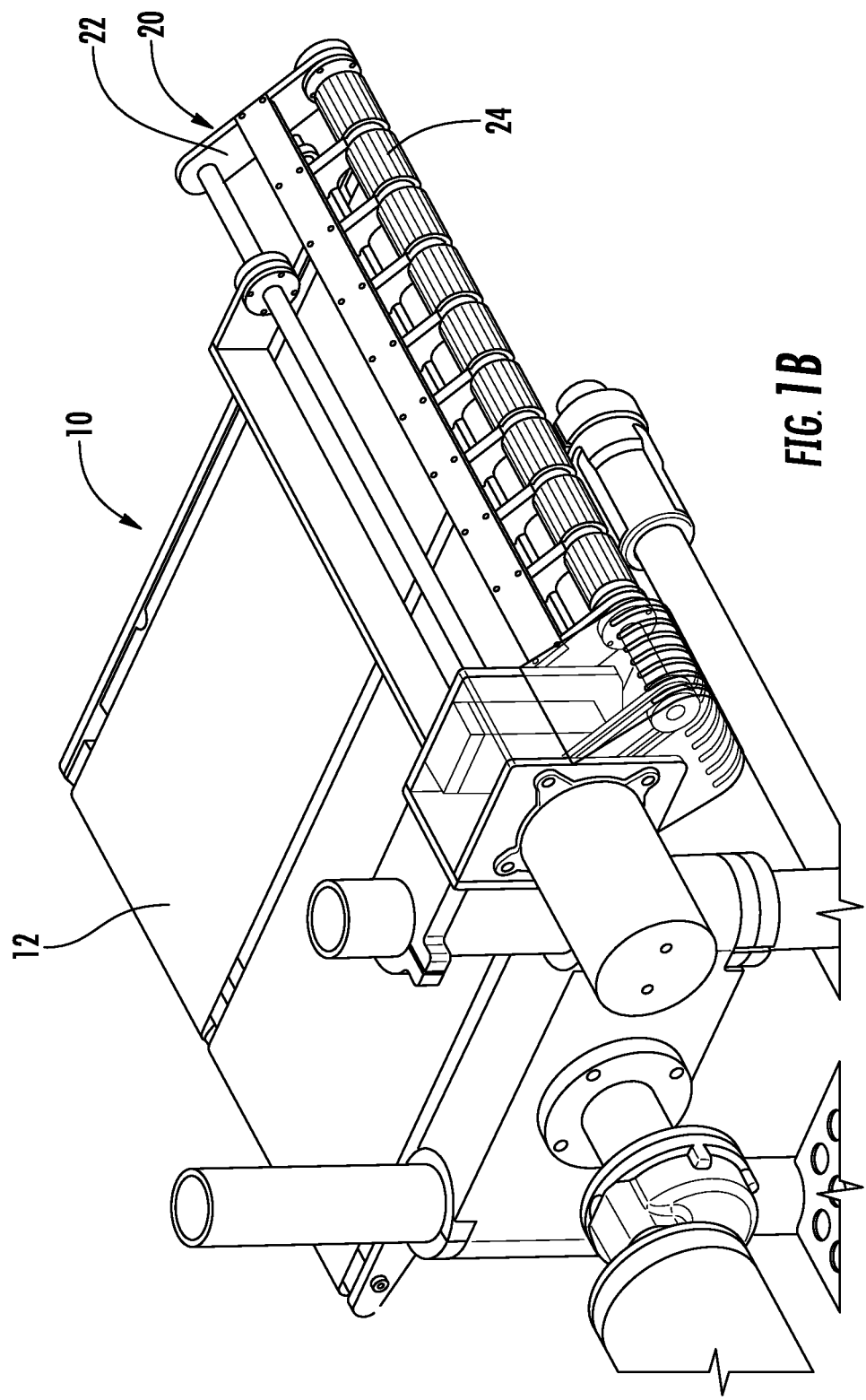
FIG. 1B is another perspective view of the rolling arrangement of FIG. 1A.
Figure 2A:
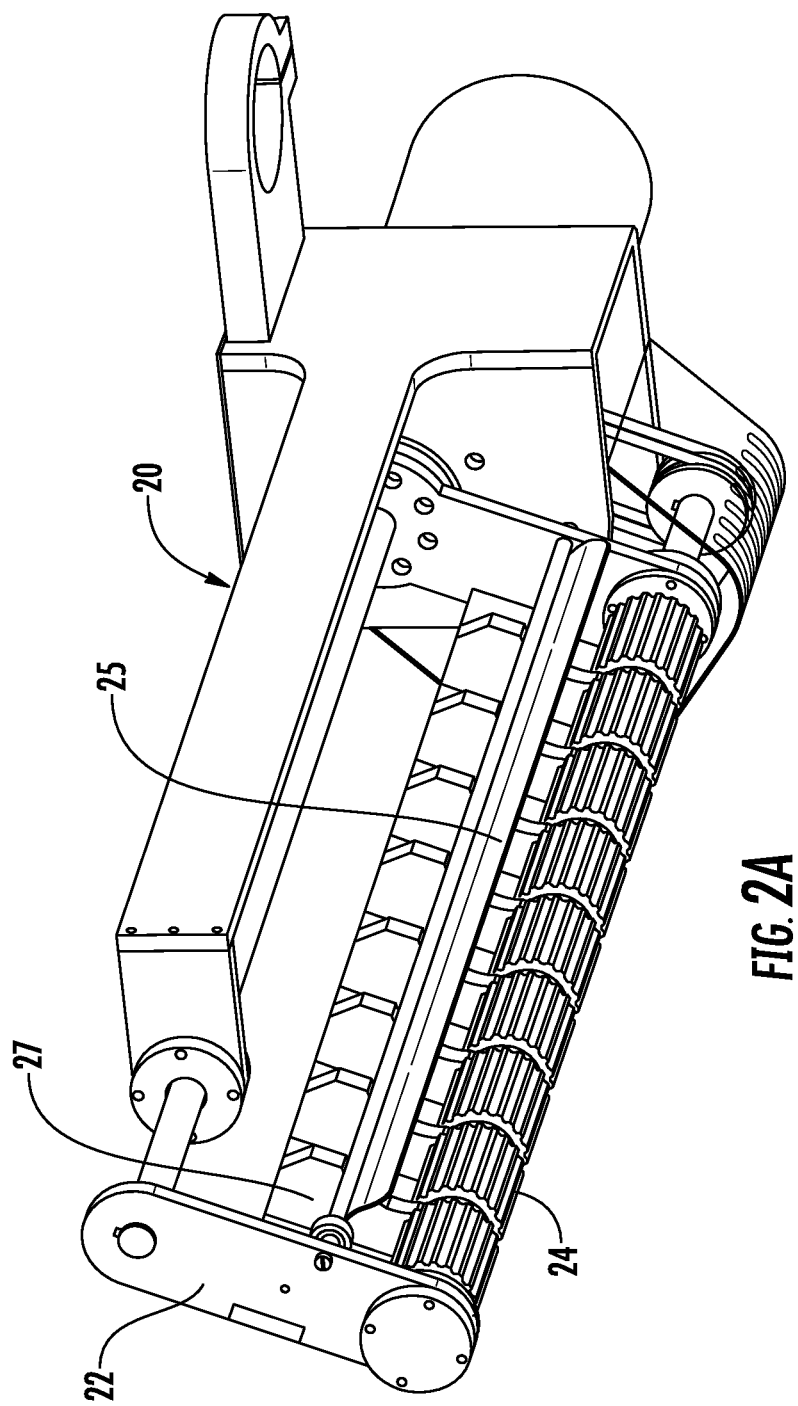
FIG. 2A is an isolated view of a rolling assembly of the rolling arrangement of FIGS. 1A and 1B.
Figure 2B:
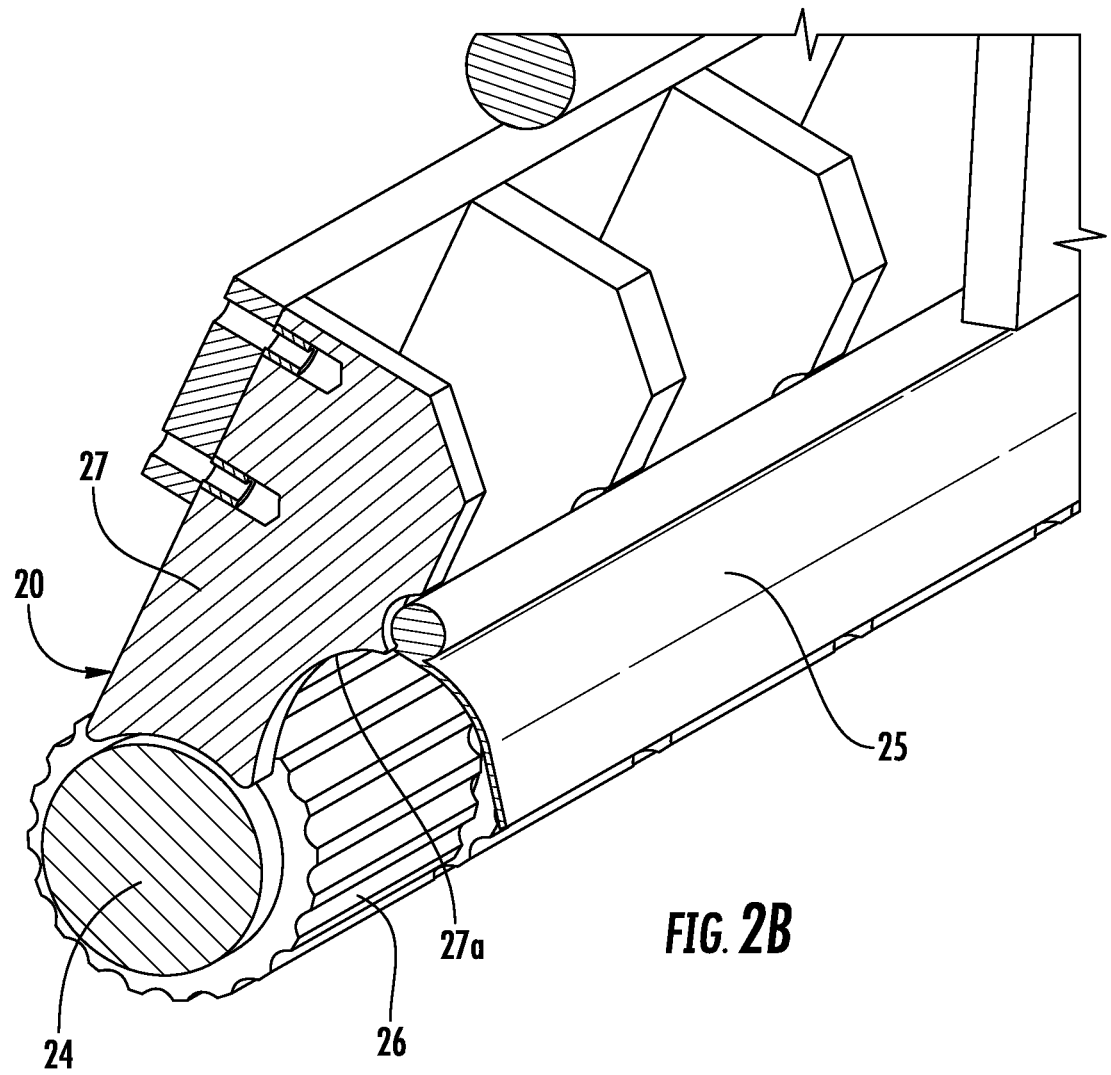
FIG. 2B is an enlarged view of a roller portion of the rolling assembly of FIG. 2A.
Figure 2C:
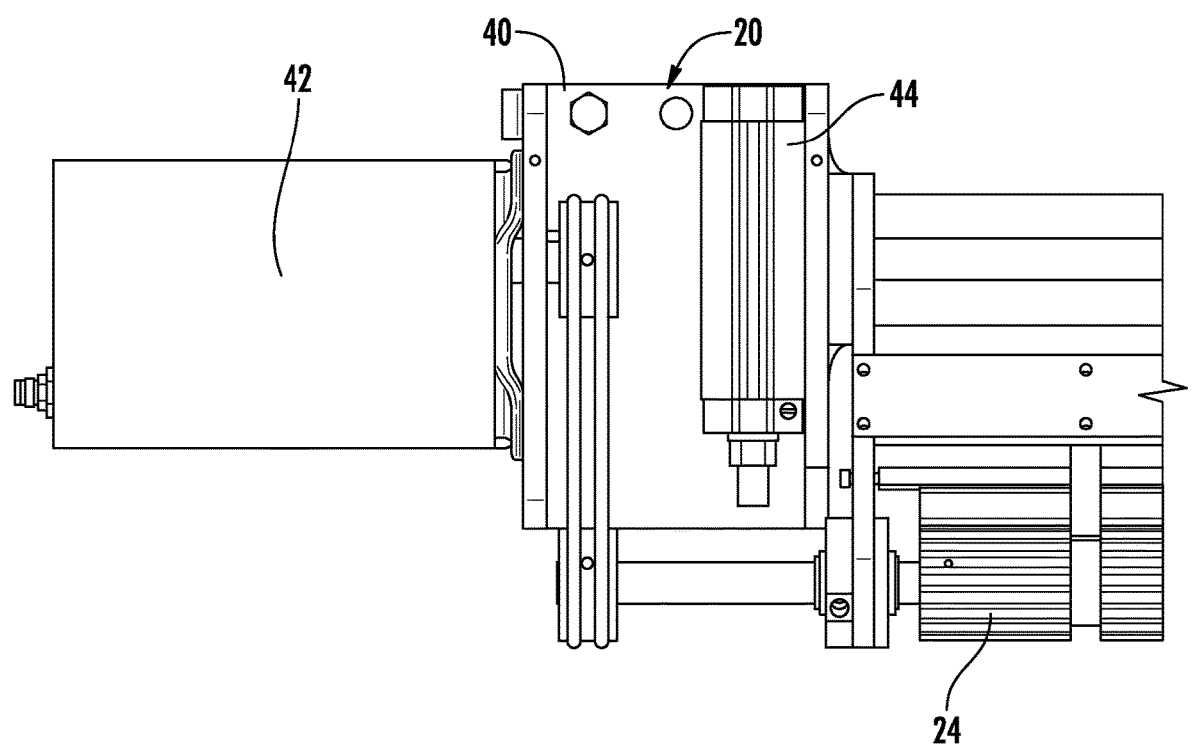
FIG. 2C is an enlarged view of an actuator portion of the rolling assembly of FIG. 2A.

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1A, 1B, 2A-2C, 3A-3C, and 4, an arrangement 10 for rolling a product or a product-substrate combination is disclosed herein. The arrangement 10 includes a drive or feed conveyor 12 adapted to drive a product-substrate combination 2 in a driving direction (as shown in FIGS. 6A-6K). In one embodiment, the product of the product-substrate combination 2 is a sheet of dough and the substrate is parchment paper. One of ordinary skill in the art would understand from the present disclosure that any variety of product-substrate combinations can be used, including but not limited to sheets of dough, meat, etc.

The arrangement 10 includes a rolling assembly 20 positioned above the drive conveyor 12. As shown most clearly in FIGS. 3A-3C, the rolling assembly 20 is positioned above the drive conveyor 12. One of ordinary skill in the art would understand that the rolling assembly 20 can be arranged below the drive conveyor 12 in another embodiment, or in any other position as long as the rolling assembly 20 is positioned in the conveying path of the drive conveyor 12.

In one embodiment, the drive conveyor 12 has a friction enhancing feature compared to conventional conveyors. In one embodiment, the drive conveyor 12 includes protrusions or bumps that further grip the product-substrate combination 2 as it is driven into contact with the rolling assembly 20. The drive conveyor 12 can be a conventional drive conveyor in one embodiment. In one embodiment, the drive conveyor 12 is treated with a friction coating. In one embodiment, the friction coating includes (i) a tacky, semi-adhesive surface coating, (ii) a textured surface, or (iii) a serrated surface.

Figure 3A:
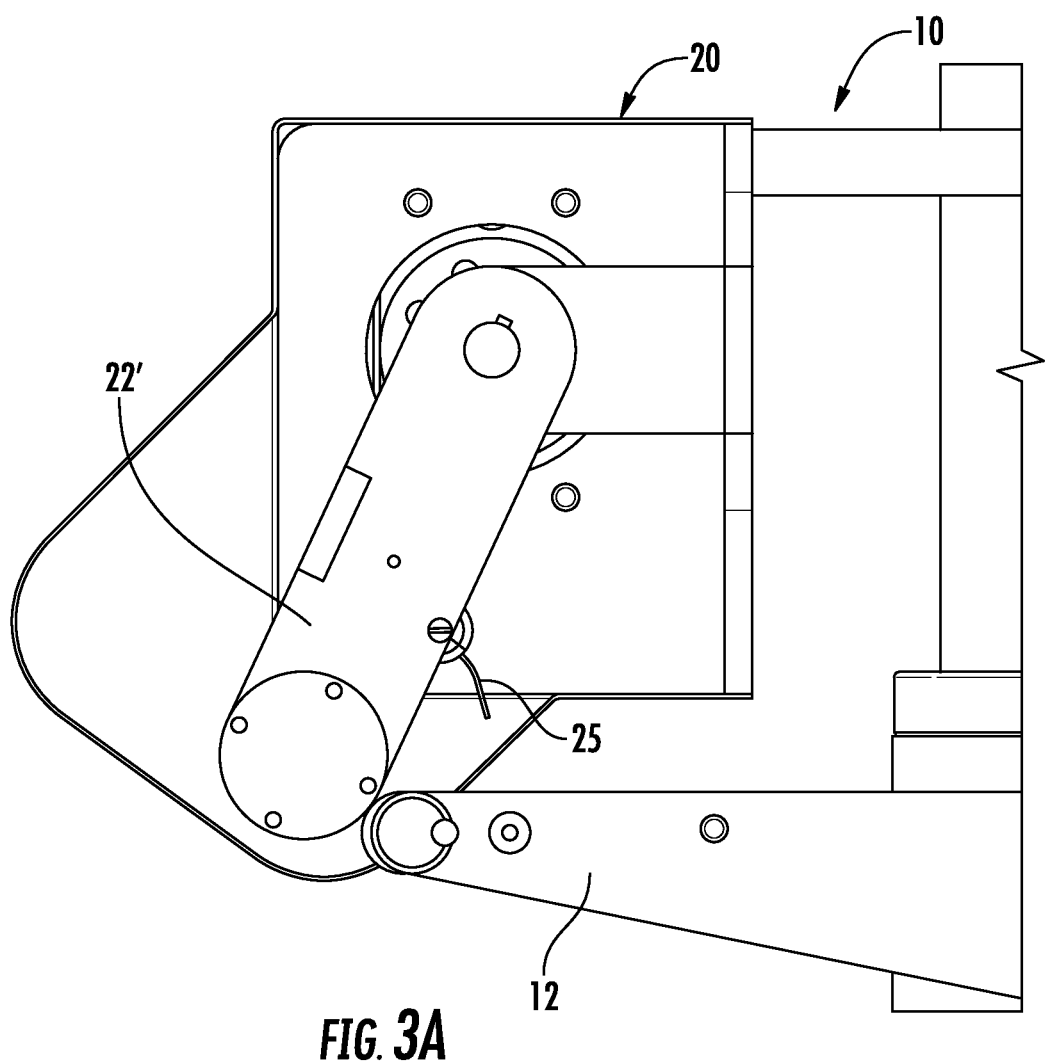
FIG. 3A is a side view of a feed conveyor arranged adjacent to a rolling assembly, with an arm in a rolling position.
Figure 3B:
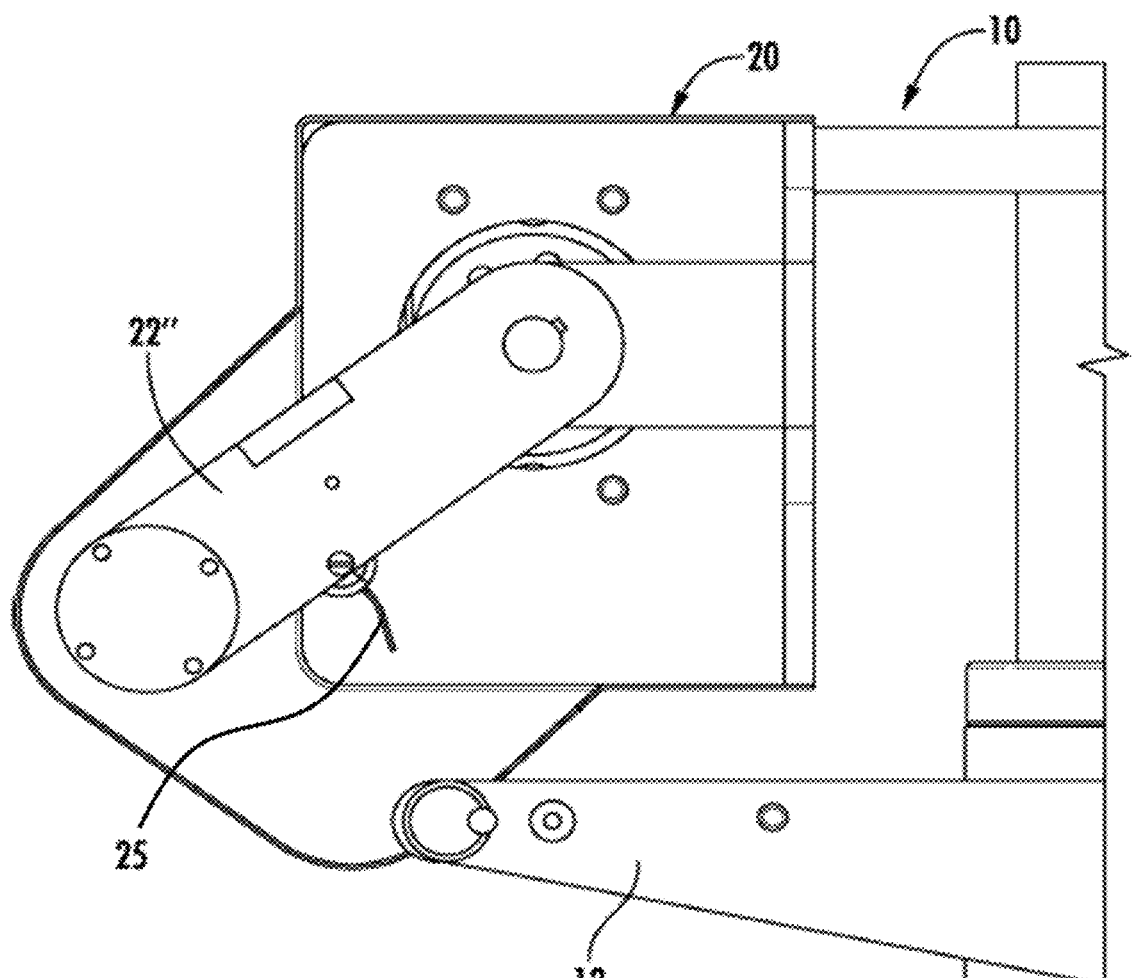
FIG. 3B is a side view of the rolling assembly of FIG. 3A, with the arm in a release position.

The rolling assembly 20 includes an arm 22 adapted to be driven between a rolling position 22' (shown in FIG. 3A) and a release position 22" (shown in FIG. 3B).

Multiple embodiments of the rolling assembly 20, 120 are disclosed herein. Generally, both embodiments include a product turner. The term product turner is used herein to refer to a roller 24, rolling conveyor 126, or any other component included in the rolling assembly 20, 120 that engages the product-substrate combination 2 and imparts a rotational/turning force on the product-substrate combination 2 such that it rolls/turns onto itself and forms a rolled product-substrate combination 2. Further details of the roller 24 and the rolling conveyor 126 are provided herein.

The roller 24 is attached to a terminal end of the arm 22 and defines a radially outer engagement surface 26 including a plurality of grooves. The roller 24 is adapted to rotate. The radially outer engagement surface 26 can include between 20-30 grooves. In one embodiment a depth of the grooves is between 1%-5% of a diameter of the roller 24. The roller 24 is preferably formed of a food-grade plastic material.

The roller 24 is positioned in a conveying path of the drive conveyor 12 when the arm 22 is in the rolling position 22' (shown in FIG. 3A) and the roller 24 is positioned away from the conveying path of the drive conveyor 12 when the arm 22 is in the release position 22" (shown in FIG. 3B). In the release position, the drive conveyor 12 drives the rolled product-substrate combination 2 beyond the rolling assembly 20.

At least one actuator 40 is configured to drive the arm 22 between the rolling position and the release position, and the at least one actuator 40 is configured to rotate the roller 24. In one embodiment, the actuator 40 includes a motor 42, preferably an A-C motor, adapted to drive rotation of the roller 24 and a rotary air cylinder 44 adapted to drive the arm 22 between the rolling position and the release position.

A guide flap 25 is mounted on the arm 22 and hangs from the arm 22. In one embodiment, the guide flap 25 has a curved profile and is adapted to articulate upon contact with the product-substrate combination 2. In one embodiment, the guide flap 25 is a freely hanging component. The guide flap 25 can pivot between two positions based on engagement with the product-substrate combination 2.

At least one roll guide 27 is mounted on the arm 22 and positioned adjacent to the roller 24. The at least one roll guide 27 defines a curved guide surface 27a adapted to engage the product-substrate combination 2. The profile of the curved guide surface 27a can be varied. The curved guide surface 27a defines a catch area for receiving a portion of the partially rolled product-substrate combination 2 as the portion is driven up and off of the drive conveyor 12.

In one embodiment, the extended end position of the guide flap 25' (shown in FIGS. 3C and 4) is predetermined such that the guide flap 25' defines a continuous curvature with the curved guide surface 27a.

In one embodiment, a sensor 45 is adapted to detect when the guide flap 25 moves from the first position to the second position. The guide flap 25, 25' is shown in the two varying positions in FIG. 4. In one embodiment, a central processing unit (CPU) 50 including a timer is provided. The CPU 50 is configured to receive a signal from the sensor 45 and initiate a countdown operation after which the CPU 50 provides a signal to the at least one actuator 40 to drive the arm 22 from the rolling position to the release position. In one embodiment, the sensor 45 is a photo sensor. In one embodiment, the sensor 45 is a break beam sensor. The CPU 50 and accompanying electronic components provide an automatic configuration for advancing the rolled product-substrate combination 2 after the rolling process is complete. The time required to complete the rolling operation can be predetermined by assembly personnel.

The CPU 50 is connected to the actuator 40 and can provide a variety of signals to the actuator 40, including the motor 42 and the rotary air cylinder 44. The CPU 50 can provide signals to drive the arm 22 between varying positions and signals to drive the roller 24.

In one embodiment, a first radius of curvature is defined by the curved guide surface 27a of the roll guide 27, and a second radius of curvature is defined by the guide flap 25, and the first radius of curvature and the second radius of curvature are identical and ends of the curved guide surface and the guide flap are aligned with each other. This arrangement ensures that a constant curvature is defined between the roll guide 27 and the guide flap 25. These features are most clearly shown in FIG. 3C. The curvature of the guide surface 27a and the guide flap 25 is complementary to the finished rolled form of the product-substrate combination 2.

Figure 3C:
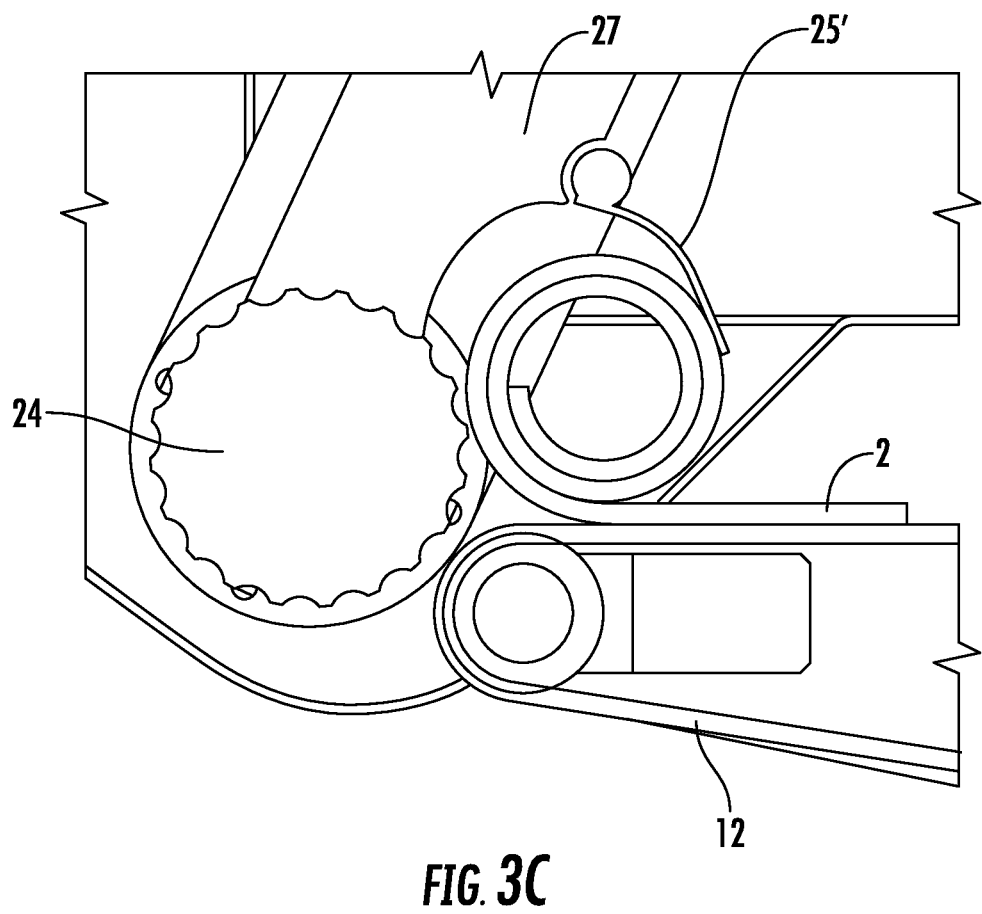
FIG. 3C is a side view of a product-substrate combination being rolled as it engages the roller of the rolling assembly.
Figure 5:
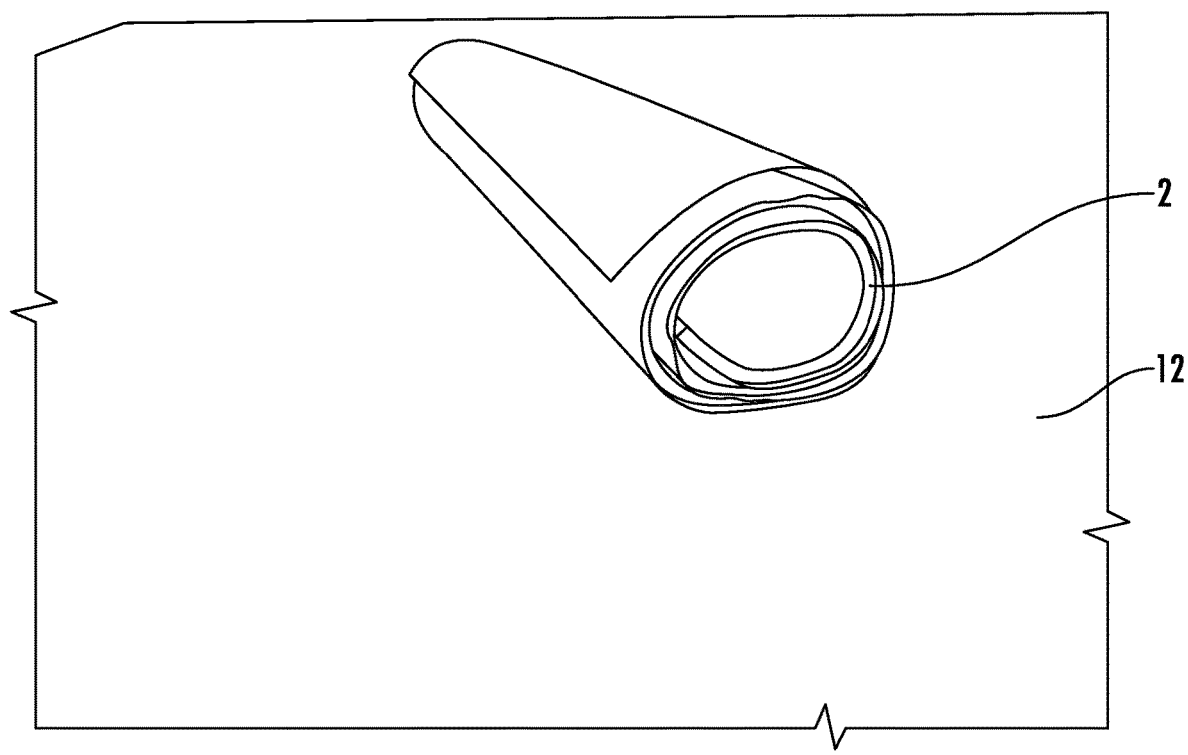
FIG. 5 is a perspective view of a product-substrate combination arranged on a feed conveyor.
Figure 6A:
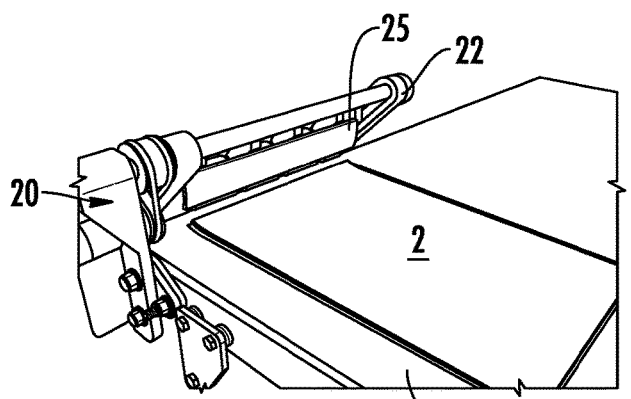
FIGS. 6A-6K illustrate varying perspective views of a product-substrate combination advancing along a feed conveyor and rolling the product-substrate combination via the rolling assembly.
Figure 6B:
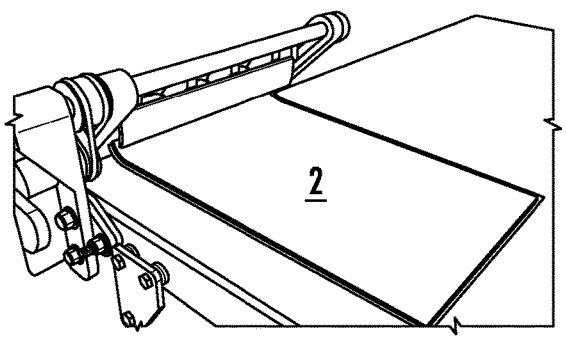
Figure 6C:
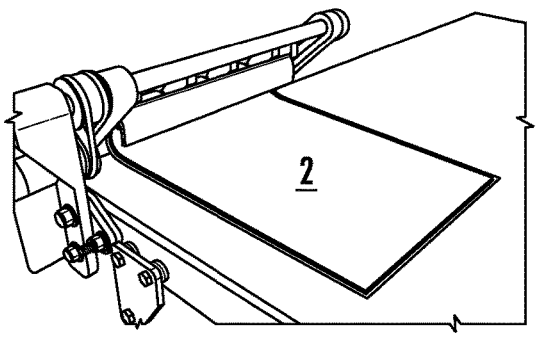
Figure 6D:
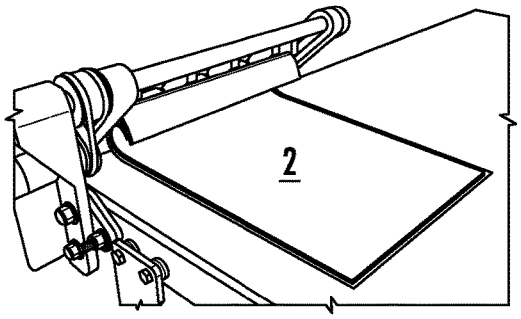
Figure 6E:
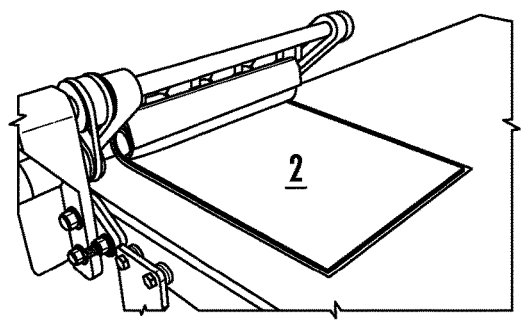
Figure 6F:
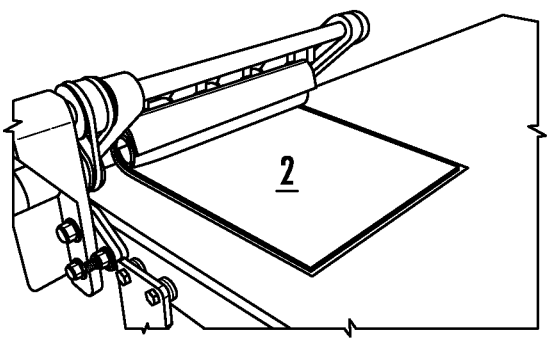
Figure 6G:
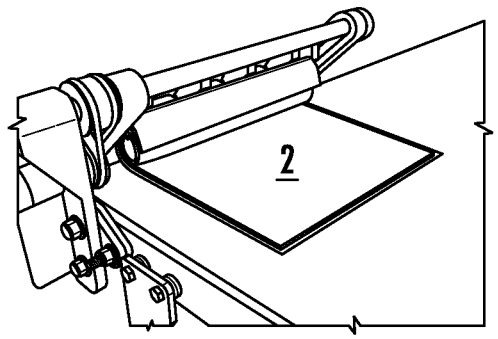
Figure 6H:
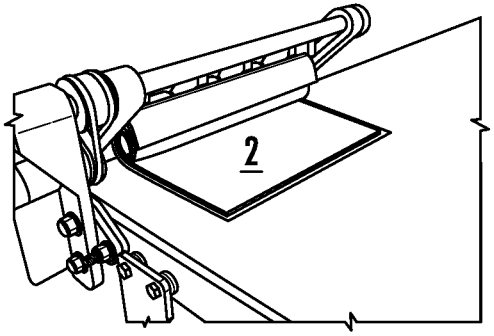
Figure 6I:
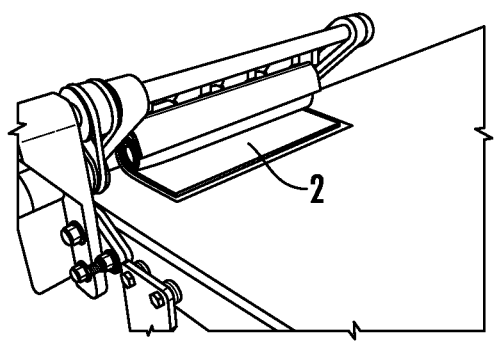
Figure 6J:
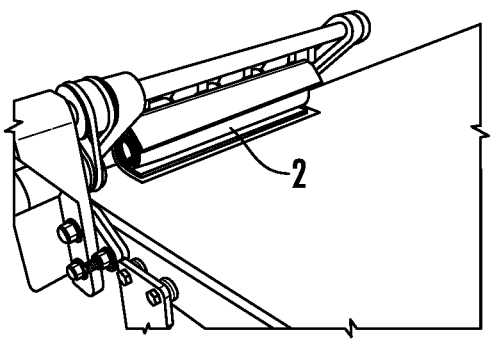
Figure 6K:
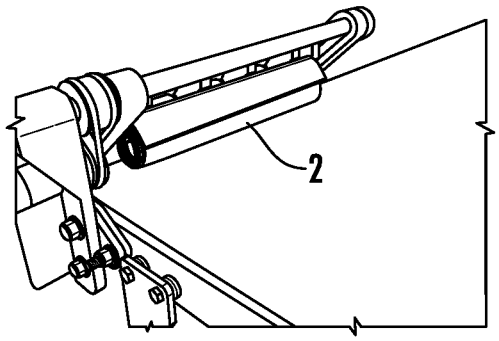

As shown in FIGS. 6A-6K, a product-substrate combination 2 is advanced on a drive conveyor 12. The drive conveyor 12 is driven at a constant speed throughout the entire process of rolling the product-substrate combination 2. The roller 24 is rotated at a corresponding speed to ensure that the product-substrate combination 2 is rolled as soon as it engages the roller 24. The drive conveyor 12 can be driven by any conventional and known drive arrangements, which are not shown in further detail herein. The rolling assembly 20 is positioned within the conveying path of the drive conveyor 12. Specifically, the roller 24 is positioned such that the roller 24 is intersected by a plane defined by a conveying surface of the drive conveyor 12 (as best shown in FIG. 3C). This arrangement ensures that the roller 24 contacts the advancing product-substrate combination 2. As shown in FIGS. 6A-6K, as the product-substrate combination 2 is advanced, the product-substrate combination 2 gradually is rolled upon itself until FIG. 6K, in which the product-substrate combination 2 is completely rolled.

In another embodiment, a method of rolling a product is disclosed. The method includes providing the arrangement 10 disclosed above. The method further includes advancing the product 2 on the drive conveyor 12 towards the rolling assembly 20 such that the product 2 initially engages the roller 24 to transition the product 2 from a flat condition to a partially rolled condition, and continuing to roll the product 2 into engagement with the at least one roll guide 27 and the guide flap 25, such that the product 2 is rolled upon itself to form a rolled product 2. The method further includes driving the arm 22 from the rolling position to the release position via the at least one actuator, such that the arm 22 is moved out of the conveying path and the rolled product 2 is advanced in the driving direction past the rolling assembly 20 for further processing and handling.

Figure 7A:
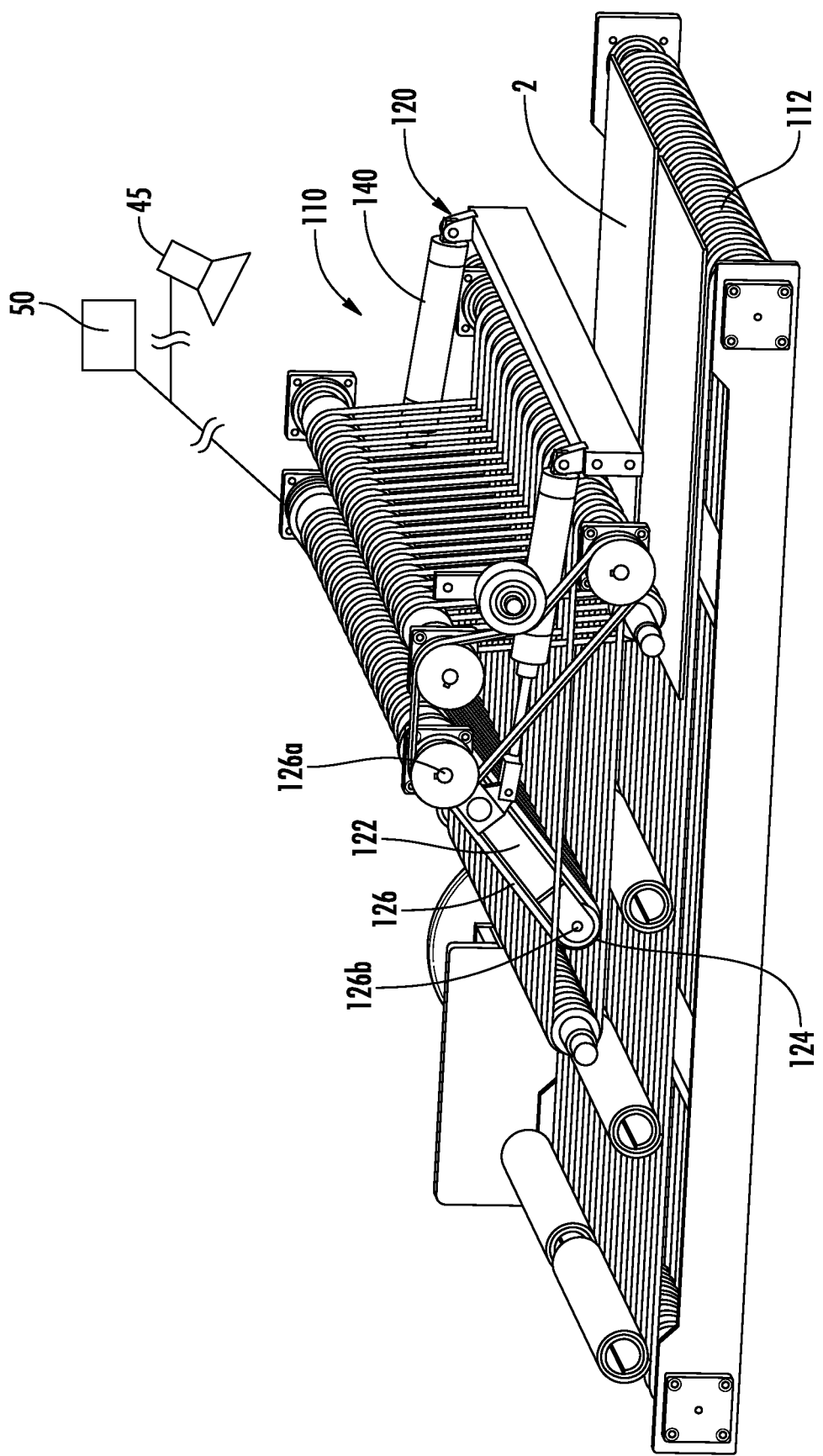
FIG. 7A illustrates a front perspective view of another embodiment of a rolling arrangement with the roller in a raised or release position.
Figure 7B:
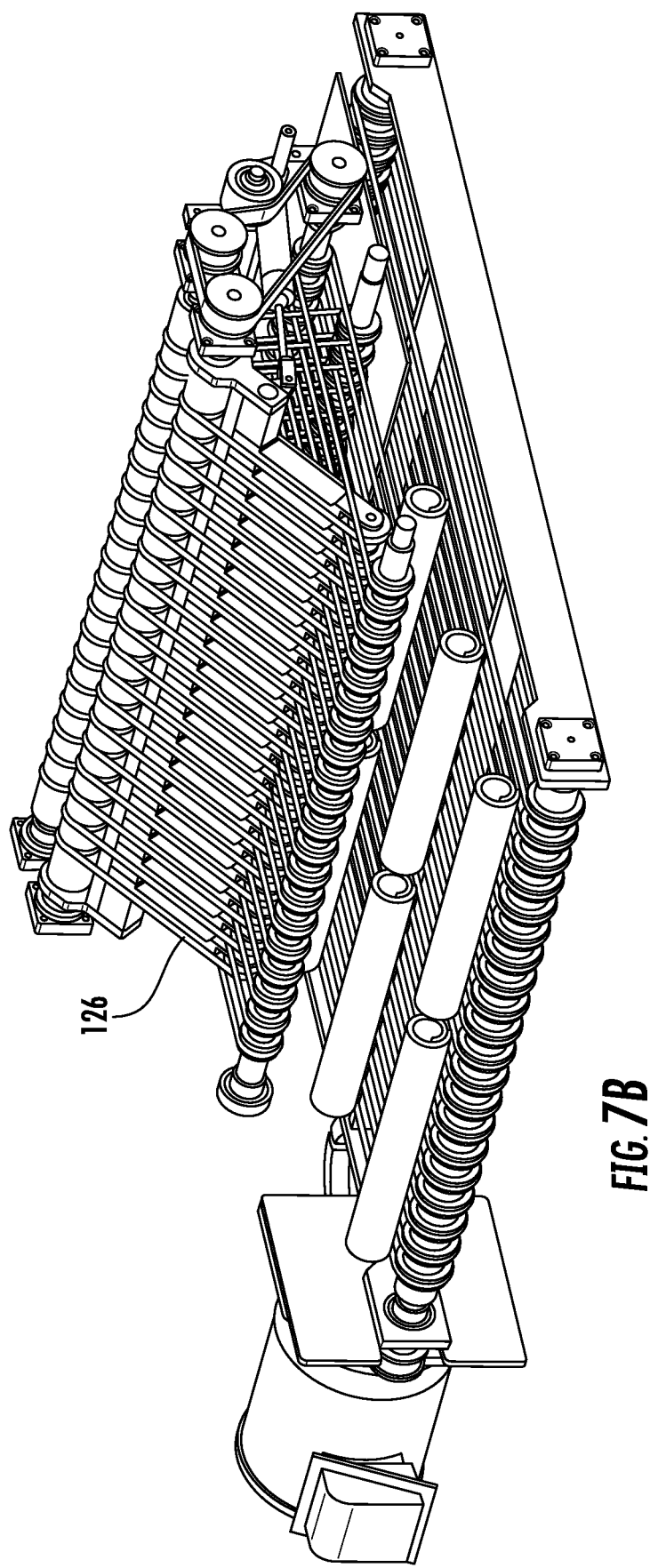
FIG. 7B illustrates a rear perspective view of the rolling arrangement of FIG. 7A.
Figure 7C:
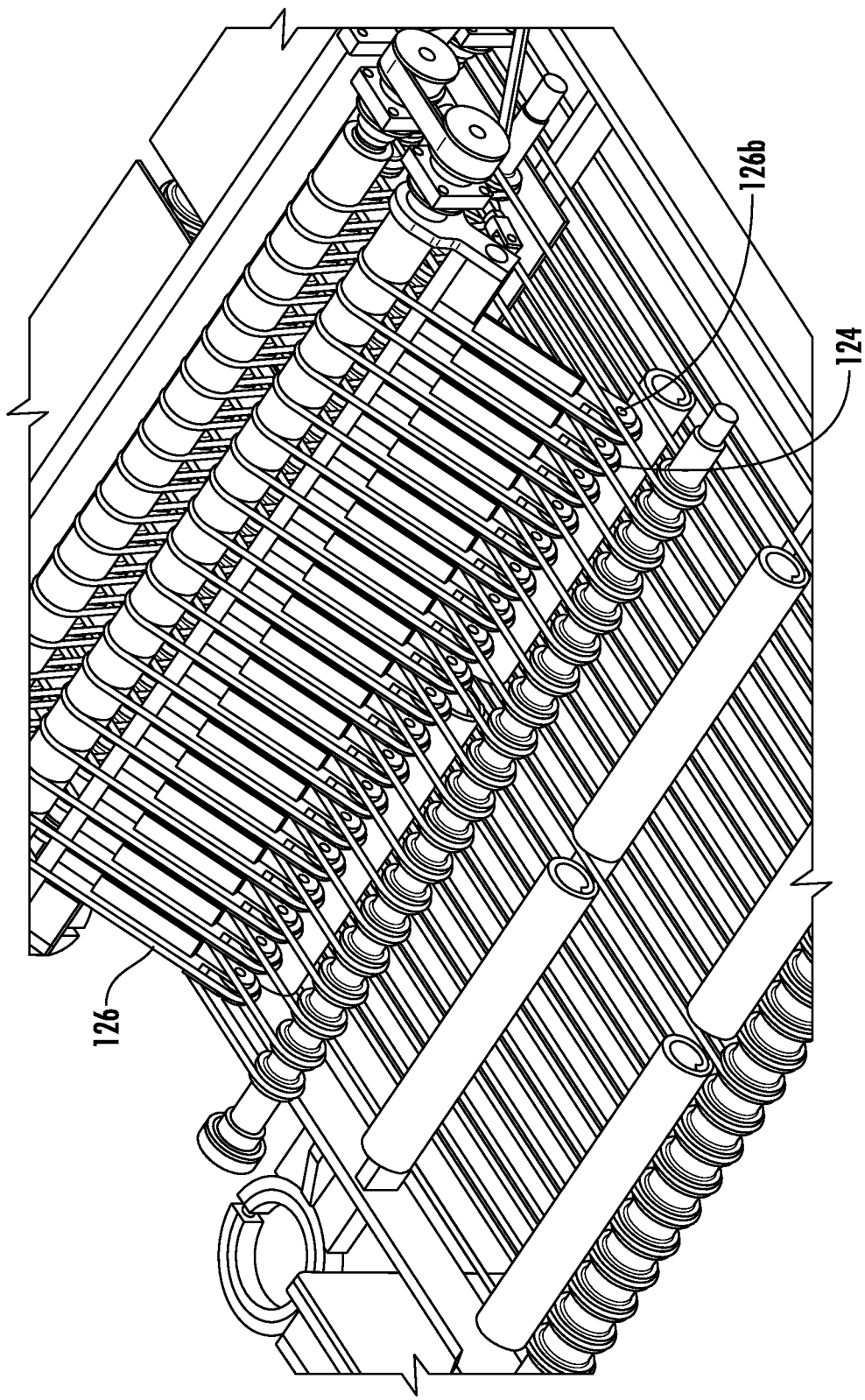
FIG. 7C illustrates a top perspective view of the rolling arrangement of FIGS. 7A and 7B.

As shown in FIGS. 7A-7D and 8A-8D, another embodiment of the rolling arrangement 110 is disclosed. Elements indicated with similar numbers, such as 10 and 110, 12 and 112, 20 and 120, etc. are similar to the embodiment described above. The general function and principle of the rolling arrangement 110 is identical to the rolling arrangement 10, unless otherwise explicitly described and defined herein. This embodiment also includes a drive conveyor 112 for advancing the product-substrate combination 2. As shown in FIG. 7A the drive conveyor 112 can include at least two lanes for two product-substrate combinations 2 being driven parallel to each other.

The rolling assembly 120 is provided above the drive conveyor 112. The rolling assembly 120 includes an arm 122 that is driven between a rolling position and a release position. The arm 122 is attached to a rolling conveyor 126 including a leading or engagement edge 124 that defines an engagement surface adapted to engage with the product-substrate combination 2. A first end 126a of the rolling conveyor 126 is fixed and defines a pivot point for the rolling conveyor 126. A second end 126b of the rolling conveyor 126 defines the leading edge 124. The second end 126b of the rolling conveyor 126 is cantilevered such that it is not supported by any additional roller or pivot mount, and extends freely.

The arm 122 is driven between the rolling position and the release position via an actuator 140. The actuator 140 can be a hydraulic cylinder or any other known actuator device. As shown in the drawings, the actuator 140 is attached to the rolling conveyor 126 at an position proximal to the first end 126a.

Figure 7D:
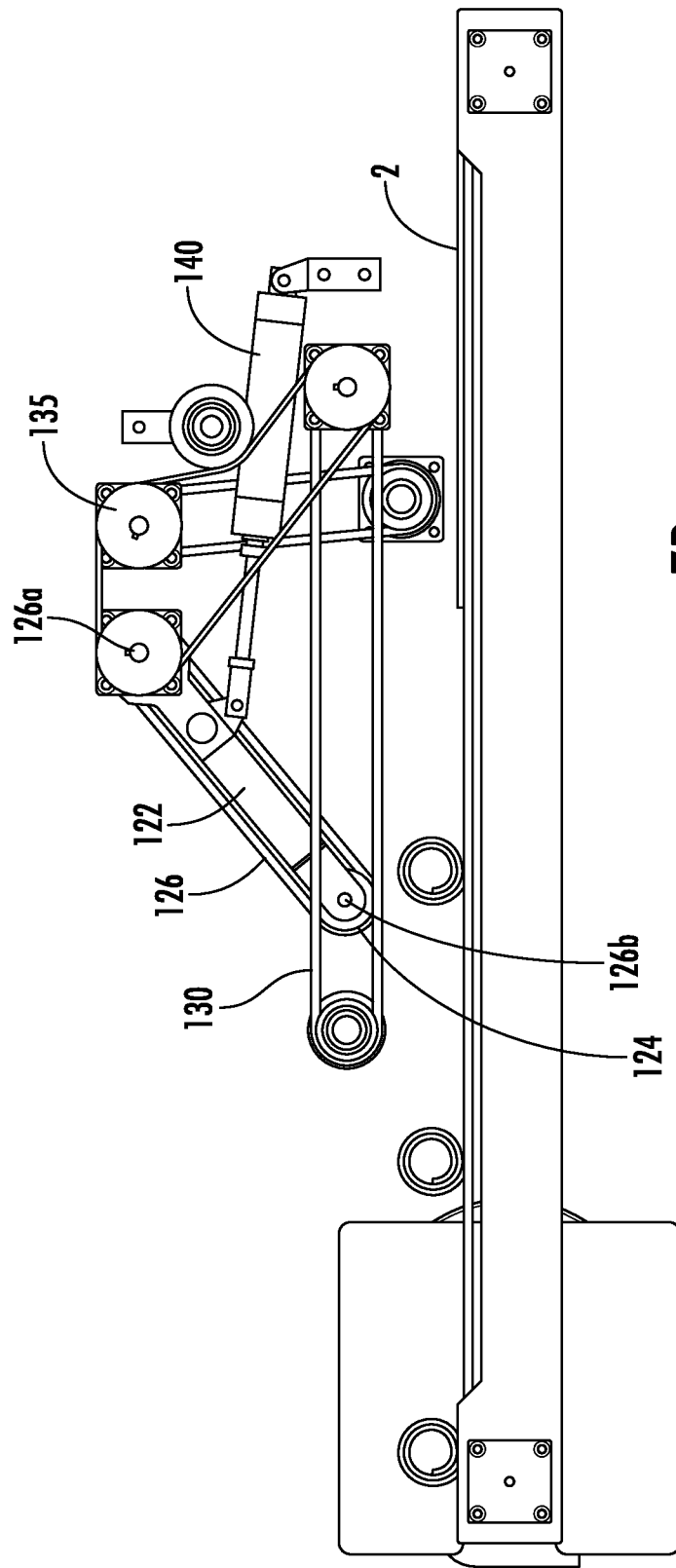
FIG. 7D illustrates a side view of the rolling arrangement of FIGS. 7A-7C.
Figure 8A:
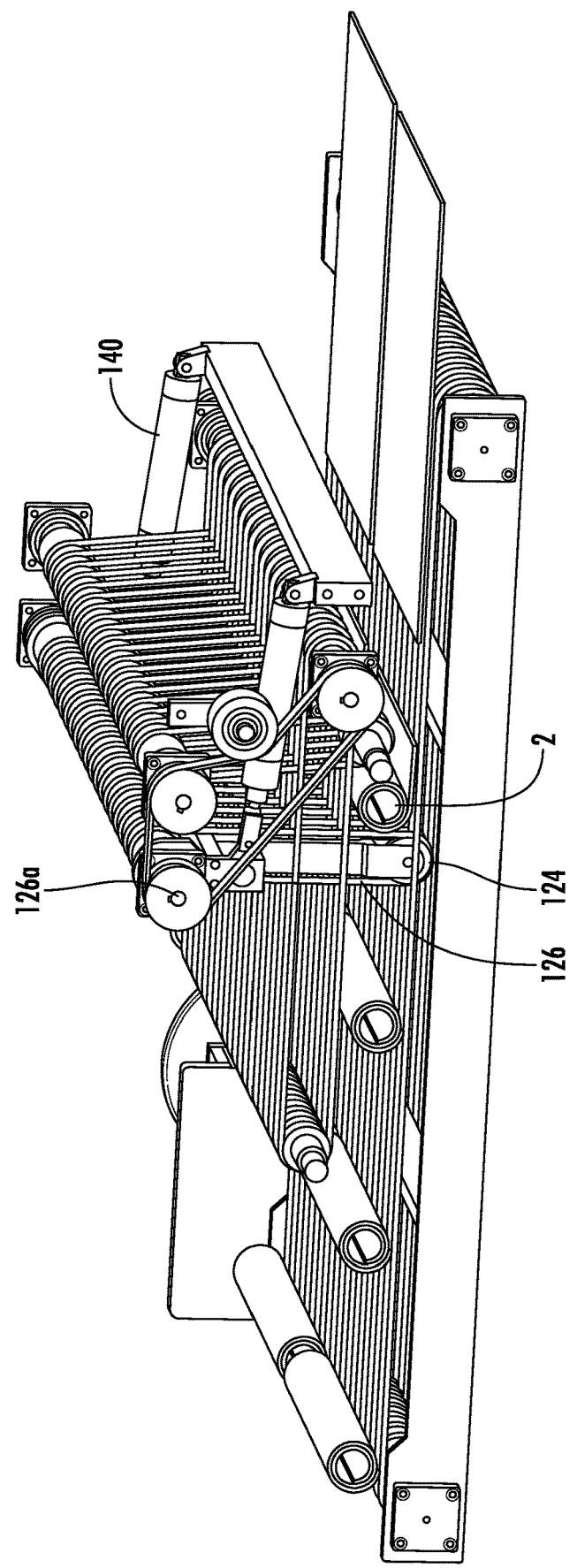
FIG. 8A illustrates a front perspective view of the rolling arrangement of FIGS. 7A-7D with the roller in a lowered or rolling position.
Figure 8B:
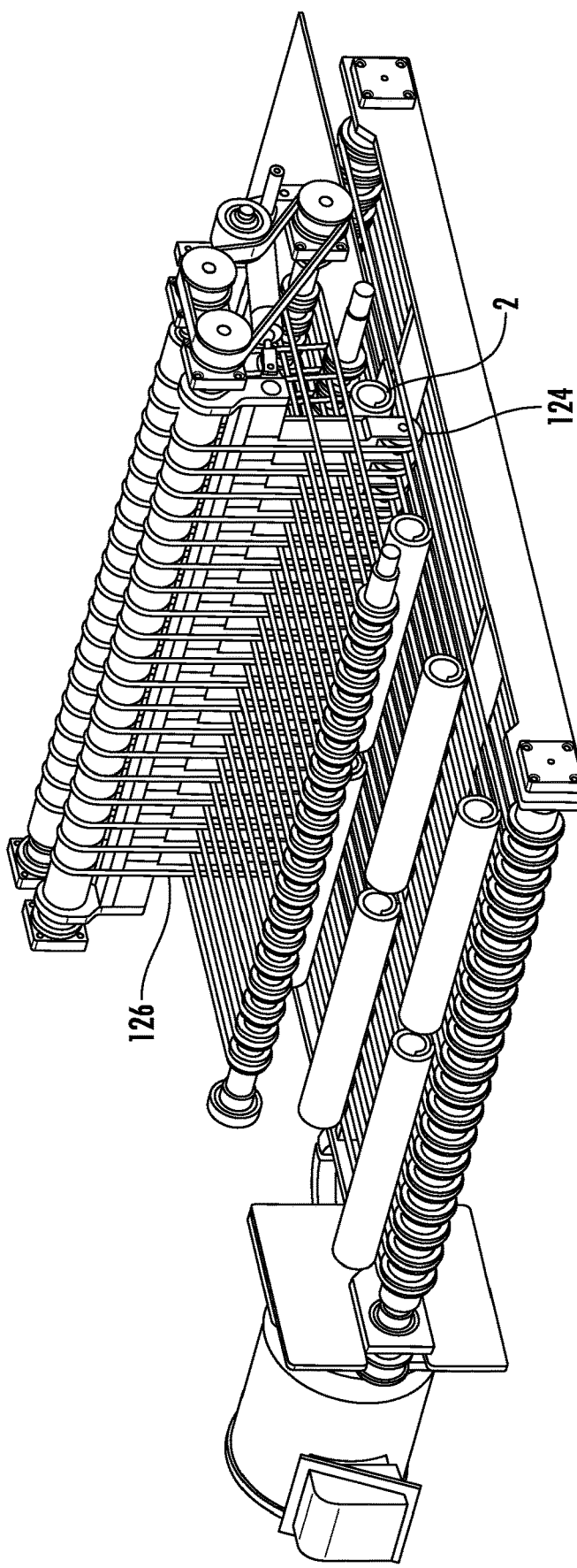
FIG. 8B illustrates a rear perspective view of the rolling arrangement of FIG. 8A.
Figure 8C:
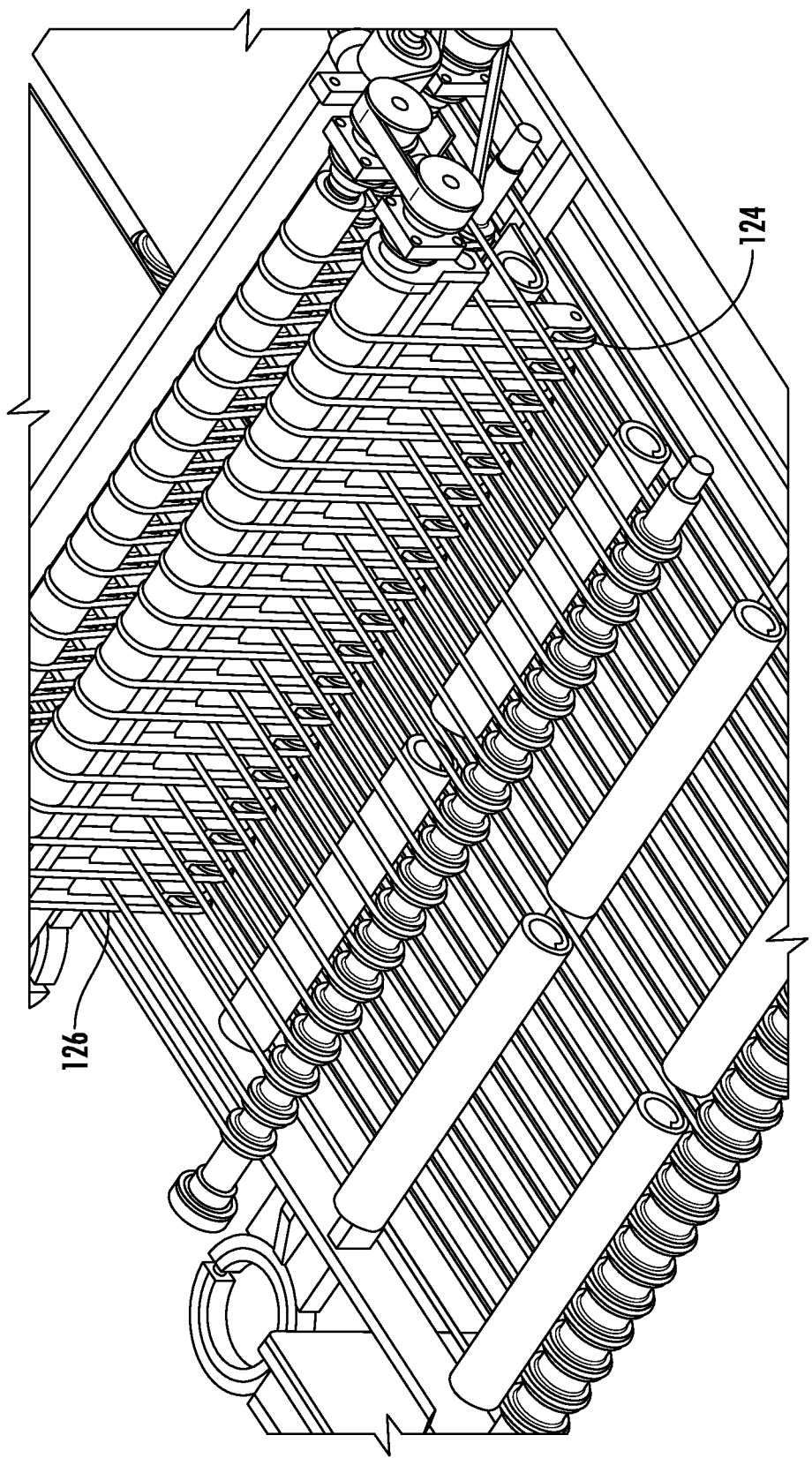
FIG. 8C illustrates a top perspective view of the rolling arrangement of FIGS. 8A and 8B.

As shown more clearly in FIGS. 7D and 8D, the rolling assembly 120 also includes a belt drive system 135. The overhead conveyor 130 is arranged parallel to the drive conveyor 112. The belt drive system 135 is configured to drive both the rolling conveyor 126 and the overhead conveyor 130, such that the rolling conveyor 126 and overhead conveyor 130 drive a series of associated bands forming the conveyors at the same speed. The belt drive system 135 also includes a series of belts and rollers, as best shown in FIGS. 7A and 8A.

As shown in FIGS. 7D and 8D, the overhead conveyor 130 is positioned slightly above an anticipated overall height of a rolled product-substrate combination 2. This positioning ensures that the overhead conveyor 130 maintains the rolled product-substrate combinations 2 in the rolled configuration as the product-substrate combinations 2 are advanced on the drive conveyor 112.

As shown in FIG. 8D, the rolling conveyor 126 interdigitates with the drive conveyor 112 in the rolling position. As used herein, the term interdigitate means that bands on the conveyors 112, 126 overlap with each other. In other words, the leading edge 124 of the rolling conveyor 126 is in the conveying path of the drive conveyor 112 or intersects/overlaps with the conveying path of the drive conveyor 112. As shown in FIGS. 7D and 8D, the rolling conveyor 126 is constantly interdigitated with the overhead conveyor 130. This arrangement saves space for the rolling assembly 120, and one of ordinary skill in the art would understand that the positions can be altered.

As shown in FIG. 7A, the rolling arrangement 110 similarly includes a sensor 45 adapted to detect a state of the product-substrate combination 2. A central processing unit (CPU) 50 can also be provided that controls the rolling arrangement 110.

The rolling conveyor 126 is positioned in the rolling position as the product-substrate combination 2 is advanced along the drive conveyor 112 in the conveying path or direction. This position is best illustrated in FIG. 8D, which shows the leading edge 124 of the rolling conveyor 126 being positioned through and below the drive conveyor 112. As the product-substrate combination 2 is advanced into contact with the rolling conveyor 126, the product-substrate combination 2 is rolled onto itself to form a cylindrical rolled product as the rolling conveyor 126 continues to rotate and the drive conveyor 112 continues to drive the product-substrate combination 2 forward.

After a predetermined period (which can be set via the CPU 50 and/or sensor 45), the rolling process is completed such that the product-substrate combination 2 forms a fully rolled product-substrate combination 2. When the rolling process is complete, the rolling conveyor 126 is then moved upward and away from the conveying path and the drive conveyor 112, such that the now rolled product-substrate combination 2 is no longer impeded by the rolling conveyor 126 and the product-substrate combination 2 advances beyond the rolling conveyor 126 along the drive conveyor 112.

As shown in FIG. 8D, the driver conveyor 112 is driven in a first direction (D1) and the rolling conveyor 126 is driven in a second direction (D2). This configuration ensures that the rolling conveyor 126 rotates upward relative to the conveying path as the product-substrate combination 2 is advanced in the first direction (D1) along the drive conveyor 112.

Having thus described the present invention in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. An arrangement for rolling a product, the arrangement comprising:
   a drive conveyor; and
   a rolling assembly positioned above the drive conveyor, the rolling assembly including:
   an arm adapted to be driven between (i) a rolling position and (ii) a release position;
   a product turner attached to the arm, such that in the rolling position, an end of the product turner extends into a conveying path of the drive conveyor; and
   at least one roll guide mounted on the arm, wherein the at least one roll guide defines a curved guide surface configured to guide a product in a curved path towards the product itself without rotation of the at least one roll guide.

2. The arrangement of claim 1, wherein the product turner is a roller that is adapted to rotate, and the arrangement further comprises:
   a guide flap mounted on the arm and hanging from the arm, the guide flap adapted to articulate from (i) a first position prior to contact with a product to (ii) a second position upon contact with a product,
   wherein the curved guide surface defined by the at least one roll guide is configured to guide a product into contact with the guide flap.

3. The arrangement of claim 2, wherein a radially outer engagement surface of the roller includes a plurality of grooves.

4. The arrangement of claim 2, wherein (i) the roller is positioned in the conveying path of the drive conveyor when the arm is in the rolling position, and (ii) the roller is positioned away from the conveying path of the drive conveyor when the arm is in the release position.

5. The arrangement of claim 2, wherein the guide flap has a curved profile.

6. The arrangement of claim 2, wherein:
   a first radius of curvature is defined by the curved guide surface of the at least one roll guide,
   a second radius of curvature is defined by the guide flap, and
   the first radius of curvature and the second radius of curvature are identical and ends of the curved guide surface and the guide flap are aligned with each other.

7. The arrangement of claim 1, further comprising at least one actuator configured to drive the arm between the rolling position and the release position, and the at least one actuator is configured to rotate the product turner.

8. The arrangement of claim 7, further comprising a central processing unit (CPU) including a timer, the CPU configured to receive an input signal from a sensor and initiate a countdown operation after which the CPU provides an output signal to the at least one actuator to drive the arm from the rolling position to the release position.

* * * * *